United States Patent
Li

(10) Patent No.: US 8,868,604 B2
(45) Date of Patent: Oct. 21, 2014

(54) METHODS AND APPARATUS FOR IMPLEMENTING SEMI-DISTRIBUTED LOCK MANAGEMENT

(71) Applicant: Oracle International Corporation, Redwood Shores, CA (US)

(72) Inventor: Fulu Li, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 13/627,808

(22) Filed: Sep. 26, 2012

(65) Prior Publication Data

US 2014/0089346 A1 Mar. 27, 2014

(51) Int. Cl.
*G06F 17/30* (2006.01)
*G06F 21/62* (2013.01)

(52) U.S. Cl.
CPC ........ *G06F 21/6218* (2013.01); *G06F 21/6227* (2013.01); *G06F 17/30215* (2013.01)
USPC ........................................... 707/781; 718/104

(58) Field of Classification Search
CPC ............ G06F 21/6218; G06F 21/6227; G06F 17/30067
USPC .................................... 707/1.1, 781; 718/104
See application file for complete search history.

(56) References Cited

U.S. PATENT DOCUMENTS

| | | | |
|---|---|---|---|
| 7,089,356 B1 | 8/2006 | Chen et al. | |
| 7,103,597 B2 * | 9/2006 | McGoveran | ........................... 1/1 |
| 8,068,114 B2 | 11/2011 | Andre et al. | |
| 8,626,709 B2 | 1/2014 | Isaacson et al. | |
| 2006/0101207 A1 | 5/2006 | Nakazato | |
| 2006/0117212 A1 | 6/2006 | Meyer et al. | |
| 2006/0190453 A1 | 8/2006 | Colrain et al. | |
| 2007/0143766 A1* | 6/2007 | Farchi et al. | ................... 718/104 |
| 2008/0244307 A1 | 10/2008 | Dasari et al. | |
| 2010/0082540 A1 | 4/2010 | Isaacson et al. | |
| 2010/0198920 A1 | 8/2010 | Wong et al. | |
| 2011/0019550 A1 | 1/2011 | Bryers et al. | |
| 2012/0011391 A1 | 1/2012 | Callaway et al. | |
| 2012/0233496 A1 | 9/2012 | Gil et al. | |

OTHER PUBLICATIONS

Maurice Herlihy, "Wait-Free Synchronization", ACM Transactions on Programming Languages and Systems, vol. 11, No. 1, Jan. 1991.
Non-final Office Action dated Oct. 25, 2013 for U.S. Appl. No. 13/309,300.
Final Office Action dated May 22, 2014 for U.S. Appl. No. 13/309,300.
Non-final Office Action dated Jul. 10, 2014 for U.S. Appl. No. 13/309,394.
Non-final Office Action dated Aug. 15, 2014 for U.S. Appl. No. 13/309,356.

* cited by examiner

*Primary Examiner* — James Trujillo
*Assistant Examiner* — Thong Vu
(74) *Attorney, Agent, or Firm* — Vista IP Law Group, LLP

(57) ABSTRACT

Disclosed is an improved approach for performing lock management. A semi-distributed Lock Management (SDLM) system is provided utilizing RDMA and an acyclic time-dependent dependency graph that can lead to higher system performance while maintaining higher flexibility and autonomy for each process at each compute node in the given cluster, in particular for distributed database applications.

36 Claims, 6 Drawing Sheets

METHODS AND APPARATUS FOR IMPLEMENTING SEMI-DISTRIBUTED LOCK MANAGEMENT

FIELD

The present invention relates to lock management in a database system.

BACKGROUND AND SUMMARY

In a database system, it is often a challenge to provide a way to synchronize access to shared resources for distributed database application. An example situation for which this type of synchronization can be used, for example, is in multi-instance database systems. A multi-instance database system contains a shared architecture in which the multiple running instances can each be used to manage a set of shared physical data files. An exemplary example of a multi-instance database system is the RAC (Real Application Cluster) product, available from Oracle Corporation of Redwood Shores, Calif., which has an architecture where in a typical scenario each of the database instances resides on a separate host and forms its own set of background processes and memory buffers, but in which the RAC infrastructure enables access to a single shared database via the multiple database instances. A synchronization mechanism is usually provided to prevent conflicts when the multiple instances seek to access the same set of shared resources.

Lock management is a common approach that is used to synchronize accesses to the shared resources. A resource corresponds to any object or entity to which shared access must be controlled. For example, the resource can be a file, a record, an area of shared memory, or anything else that can be shared by multiple processes in a system. A hierarchy of resources may be defined, so that multiple levels of locking can be implemented. For instance, a database might define a resource hierarchy as follows: Database->Table->Record (Row)->Field, in descending order. A process can then acquire locks on the database as a whole, and then on particular parts of the database. A lock must be obtained on a parent resource before a subordinate resource can be locked.

There are several possible approaches that can be taken to implement a lock management system. One common approach is to use a centralized lock management (CLM) service in which the locks are managed in a centralized location. The enqueues of the lock requests are centrally managed in a dedicated database (DB) component. When an instance seeks access to a given resource, the instance sends a request to the centralized lock management component to obtain a lock on the resource.

One problem with the CLM approach is that performance bottlenecks may exist because of the centralized nature of the lock management system, since all instances must go through a single centralized location to obtain locks on resources. Additionally, the CLM approach poses the risk of having single point of failures. Therefore, the centralized approach lacks the flexibility and autonomy needed by processes at each compute node in modern multi-instance database systems.

Another possibility is to use a Distributed Lock Management (DLM) approach, which permits multiple database instances to access the same database files simultaneously, where communications between the instances are managed by the Distributed Lock Manager (DLM). To address the possibility of two or more instances attempting to modify the same information simultaneously, the DLM uses multiple distributed processes (e.g., ten background processes named LCK0 through LCK9) to lock the resources in use by these instances.

However, there are also many challenges with this approach. One problem is that communications between instances for the DLM often involve broadcast of the enqueue messages among compute nodes in the cluster, which can lead to heavy overhead of network communications, which is particularly a problem due to sometimes unreliable network transmissions. Another issue is that deadlock is often a major challenge and complicated deadlock detection algorithm has to be developed. In addition, the DLM approach often leads to longer latency due to the complicated coordination and deadlock detection among compute nodes in the cluster. Due to these reasons, this approach does not scale well with a large number of compute nodes, say in the number of hundreds, in the cluster due to the heavy overhead of network communications of the enqueue messages and complicated coordination and deadlock detection for DLM.

Therefore, there is a need for an improved approach to synchronize accesses to shared resources for distributed database application that addresses at least these problems with the alternative approaches.

SUMMARY

Some embodiments of the invention pertain to an improved approach for performing lock management. A Semi-distributed Lock Management (SDLM) system is provided utilizing RDMA and an acyclic time-dependent dependency graph. The approach provides deadlock prevention methodology that utilizes the collective efforts from the processes at the distributed compute nodes in the cluster.

In some embodiments, the invention comprises: (a) architecture: with the shared-storage architecture in multi-instance database systems, a mapping is performed to a dedicated memory portion from each of the compute node in the same cluster to the same memory portion of the shared storage node using RDMA (remote direct memory access) technology; (b) lock variables: each lock variable is defined as a CAS (compare and swap) variable, for which only atomic operations are performed, where the lock variables are stored in the dedicated memory portion in the shared storage node that are directly accessible using RDMA by each process at each compute node in the cluster; (c) protocol: when a process from a compute node requests a lock, it tries to directly access the given CAS lock variable using RDMA, where if the lock request succeeds, then it gets the lock; (d) deadlock prevention/detection: an acyclic time-dependent dependency graph is used for quick deadlock prevention/detection, where vertex variables and link variables that are used to define the dependency graph are CAS (compare and swap) variables, for which only atomic operations are performed for the RDMA model.

The time-dependent dependency graph is an acyclic directed graph, which indicates the dependency relationship among locks in the given system. With this acyclic time-dependent dependency graph that are defined by a set of CAS variables and are directly accessible by each process at each compute node in the cluster, one can always guarantee that the database system is deadlock-free.

This greatly simplifies the complicated deadlock detection process, which is often a daunting task for existing distributed lock management solutions. The Semi-distributed Lock Management (SDLM) with RDMA and an acyclic time-dependent dependency graph can lead to higher system performance while maintaining higher flexibility and autonomy for each process at each compute node in the given cluster, in particular for distributed database applications.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1:
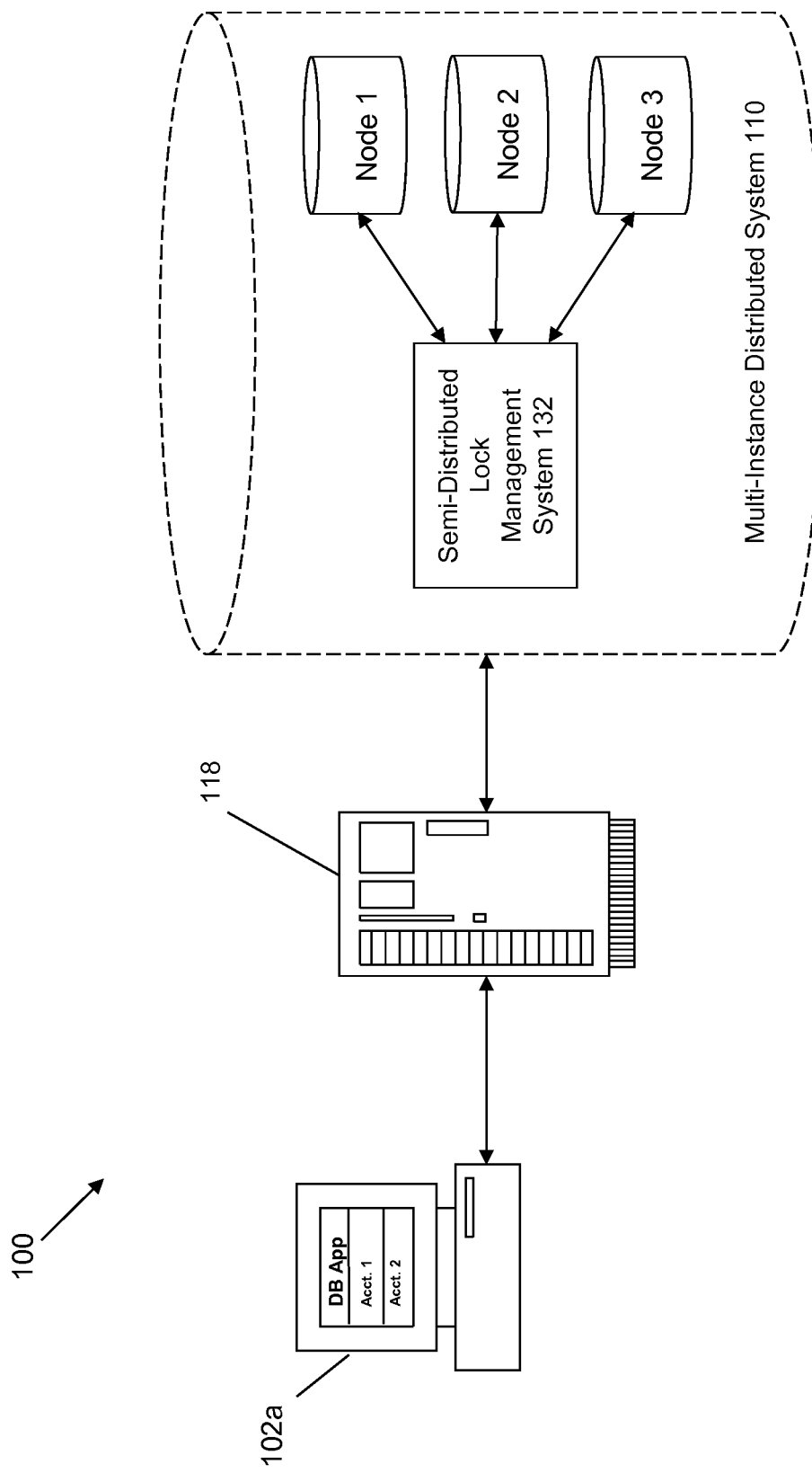
FIG. 1 illustrates an example system for implementing semi-distributed lock management according to embodiments of the invention.

A method, system, and computer program product are provided for implementing semi-distributed lock management for a distributed processing system. Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of RAC-based multi-instance systems. It is noted, however, that the invention is not limited in its scope to RAC-based systems, and indeed, may be applied to other types of systems without limitation.

The inventive approach provides semi-distributed lock management, which comprises a centralized locking structure that can be directly managed by distributed entities/nodes. FIG. 1 shows an architecture of a system 100 for implementing semi-distributed lock management according to some embodiments of the invention. System 100 may include one or more users at one or more user stations 102a. The users operate the system 100 to access and utilize applications on a server 118 (e.g., a database server) to perform any activities operable using the system 100. In system 100, user station 102a comprises any type of computing station that may be used to operate or interface with a server 118. Examples of such user stations 102 include for example, workstations, personal computers, laptop computers, remote computing terminals, tablet devices, tablet computers, portable readers, mobile telephone devices, smartphones, or programmable mobile handsets. It is noted that the invention is not limited in its application to just these types of devices. The user station 102a comprises a display device, such as a display monitor or screen, for displaying scheduling data and interface elements to users. The user station 102a may also comprise one or more input devices for the user to provide operational control over the activities of system 100, such as a mouse, touch screen, keypad, or keyboard. The users of user station 102a correspond to any individual, organization, or other entity that uses system 100 to remotely access applications on application server 118, such as a database application on application server 118.

The server 118 may be implemented using, or may access, a distributed processing system, such as a multi-instance system 110 having multiple nodes 1, 2, and 3. For example, multi-instance system 110 in some implementations corresponds to a RAC system where each node 1,2,3 corresponds to a separate database instance that resides on a separate host, and which has its own set of processes and memory buffers, but in which the RAC infrastructure enables each of the nodes to access a single shared database.

According to some embodiments of the invention, when the user at the user station 102a accesses an application (e.g., a database application) on server 118, the server 118 will access data within the distributed system 110. To access the data, a lock may need to be acquired using the lock management system. There are many types of locks that may potentially be taken on the data. A lock typically has multiple modes as follows:

Null Lock (NL), which normally indicates interest in the resource, but does not prevent other processes from locking it. It has the advantage that the resource and its lock value block are preserved, even when no processes are locking it.

Concurrent Read (CR), which normally indicates a desire to read (but not update) the resource. It allows other processes to read or update the resource, but prevents others from having exclusive access to it. This is usually employed on high-level resources, in order that more restrictive locks can be obtained on subordinate resources.

Concurrent Write (CW), which indicates a desire to read and update the resource. It also allows other processes to read or update the resource, but prevents others from having exclusive access to it. This is also usually employed on high-level resources, in order that more restrictive locks can be obtained on subordinate resources.

Protected Read (PR), which is the traditional share lock that indicates a desire to read the resource but prevents other from updating it. Others can however also read the given resource.

Protected Write (PW), which is the traditional update lock that indicates a desire to read and update the resource and prevents others from updating it. Others with Concurrent Read access can however read the given resource.

Exclusive (EX), which is the traditional exclusive lock that allows read and update access to the resource, and prevents others from having any access to it.

Shared (S), which is the traditional share lock that indicates a desire to read the resource but prevents other from updating it. Others can however also acquire the share lock to read the given resource.

In embodiments of the invention, a process obtains a lock on a resource by enqueueing a lock request using a semi-distributed lock management system 132. In some embodiments, the semi-distributed lock management system 132 provides centralized locks which can be directly managed by any of the distributed entities/nodes 1, 2, 3.

One possible approach that can be taken to implement the semi-distributed lock management system is with RDMA (remote direct memory access) technology. RDMA is a technique to perform direct memory access from the memory of first computing node into that of another computing node without necessarily using the operating system of either node. This means that RDMA supports zero-copy networking by enabling direct transfer of data directly to or from the memory of a remote computing node. This removes the need to copy data between application memory and the data buffers in the operating system, and avoids the need for additional work and expense by CPUs, caches, or context switches to effect the transfer of data between nodes.

Figure 2:
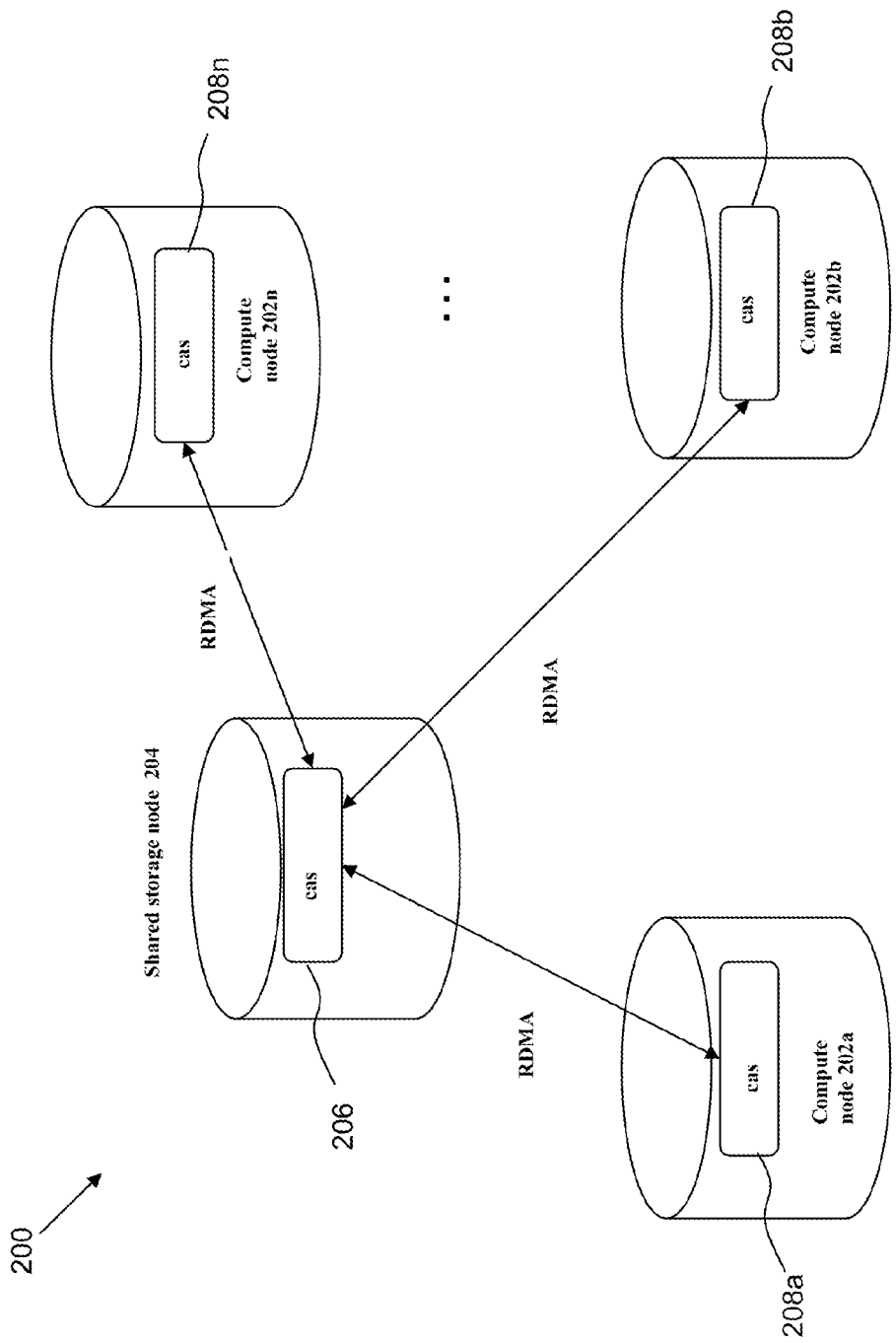
FIG. 2 illustrates semi-distributed lock management using RDMA and CAS lock variables according to embodiments of the invention.

FIG. 2 provides an illustration of a semi-distributed lock management system in a multi-instance database system 200 according to some embodiments of the invention. In this example, there are n compute nodes 202a, 202b, 202n and one shared storage node 204 in the multi-instance system 200. A dedicated memory portion 206 is allocated in the shared storage node 204 to store the locks, which can be accessed by all compute nodes 202a, 202b, 202n via RDMA. With the shared-storage architecture of in multi-instance database systems, e.g., Real Application Clusters (RAC), the present embodiment maps a dedicated memory portion from each of the compute node in the same cluster to the same memory portion of the shared storage node using RDMA (remote direct memory access) technology to be used for lock management. Therefore, each of the compute nodes 202a, 202b, 202n includes its own copy 208a, 208b, 208n, respectively, that maps to the dedicated memory portion 206. When a compute node seeks to acquire a lock on a resource, that node will use RDMA to directly modify the lock structure in the dedicated memory portion 206 of the shared storage node 204.

Any suitable networking/communications infrastructure can be used to implement the semi-distributed lock management system. In some embodiments, the underlying communication infrastructure between compute nodes and the shared storage node comprises InfiniBand InfiniBand is a switched fabric communications link often used in high-performance computing and enterprise data centers. The InfiniBand architecture specification defines a connection between processor nodes and high performance I/O nodes, where all transmissions begin or end at a "channel adapter." Each processor contains a host channel adapter (HCA) and each peripheral has a target channel adapter (TCA).

Each lock variable is defined as a CAS (compare and swap) variable, for which only atomic operations are performed. CAS is an atomic instruction, where the contents of a memory location are compared to a given value and, only if they are the same, modifies the contents of that memory location to a given new value. The atomicity guarantees that the new value is calculated based on up-to-date information; if the value had been updated by another thread in the meantime, the write would fail. Note that the lock variables are stored in the dedicated memory portion in the shared storage node, which are directly accessible using RDMA by each process at each compute node in the cluster.

When a process from a compute node requests a lock, it tries to directly access the given CAS lock variable using RDMA. If the lock request succeeds, then it gets the lock. Otherwise, it will try again after a random delay. The random number is generated with a seed as the function of the CPU ID and the process ID that the given lock request is associated with to minimize the chance of simultaneous trials of the access of the same lock variable in the shared storage node even though the operation is atomic.

Figure 3:
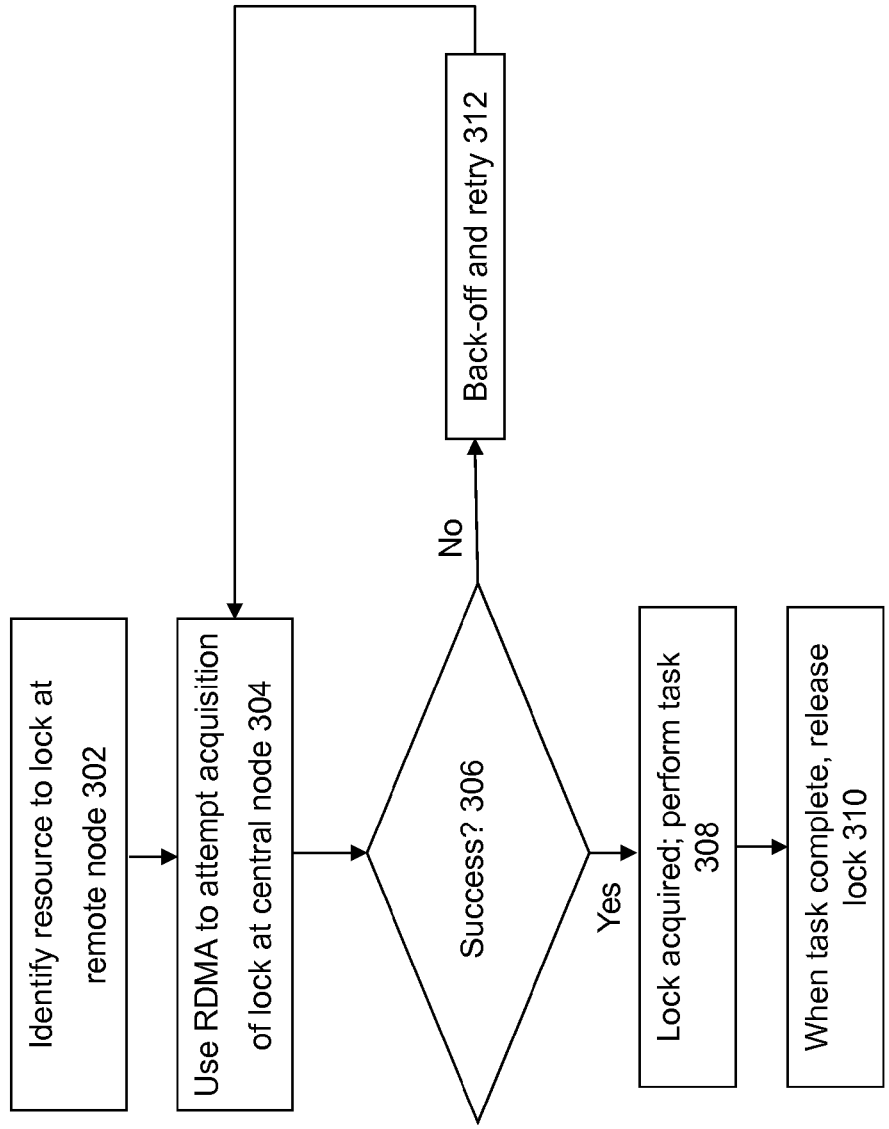
FIG. 3 illustrates a flowchart of an approach to implement semi-distributed lock management according to embodiments of the invention.

FIG. 3 is a flowchart of an operation flow for some embodiments of the invention. At 302, the process at a computing node will identify a resource that need to be locked. This is based, for example, upon a need to access a database resource (such as a data item within a database). The lock is sought to obtain the appropriate level of exclusivity upon the resource. For example, an exclusive lock may be sought to perform a Write or Modify operation upon the resource. A shared lock may be sought to perform a Read operation upon the resource.

At 304, an attempt is made to obtain the desired lock on the resource. When a process from a compute node requests a lock with a certain mode for a shared resource, it tries to directly access the given CAS lock variable that is stored in a dedicated memory portion in the shared storage node using RDMA.

A determination is made at 306 whether the lock request can be granted. It is possible that lock being sought by the compute node cannot be granted at the time of the lock request. For example, if an exclusive lock is already being held on the resource by another entity, then a later request for an exclusive or shared lock on that same resource cannot be granted. Similarly, if a shared lock is already being held on the resource, then a request for an exclusive lock on that same resource cannot be granted.

If the lock request succeeds, then at 308, the processing entity will obtain the lock and updates the lock variable value accordingly using RDMA. At some later point in time, when a process has finished the task requiring the lock, then the lock is released at 310. As when acquiring the lock in the first place, release of the lock can also be performed by updating the appropriate lock variable value at the centralized storage location using RDMA.

If the lock request fails, it will try again after a delay period at 312. The delay period may be established, for example, as a random delay period using an exponential backoff function or other suitable backoff functions, depending on system resource availability and system dynamics. The random number is generated with a seed as the function of the CPU ID and the process ID that the given lock request is associated with to minimize the chance of simultaneous trials of the access of the same lock variable using RDMA even though the operation is atomic.

Some embodiments also provide for an improved approach for implementing deadlock prevention. A deadlock is a situation which occurs when a first process enters a waiting state because a resource it has requested is already locked by a second process. The problem occurs when the second process itself is in a waiting state as a result of a lock currently being held by the first process. The deadlock may exist through an indefinitely long chain of such inter-connected processes and locks, e.g., where P1 holds a lock L1 that is sought by P2, where P2 holds a lock L2 that is sought by P3, and where P3 holds a lock L3 that is sought by P1. If any of the processes in these situations is unable to change its state indefinitely because the requested resources are being locked by another waiting process, then they are in a deadlocked situation.

Most approaches to resolving this problem pertain to deadlock "detection" techniques, which can be used to detect the occurrence of a deadlock situation. With deadlock detection, deadlocks are allowed to occur in the system, but the state of the system is examined to detect that a deadlock has occurred and to subsequently correct for the deadlock. An algorithm is employed that tracks resource allocation and process states, it rolls back and restarts one or more of the processes in order to remove the detected deadlock.

In contrast, the present embodiment of the invention provides an approach for preventing deadlock from occurring in the first place by using an acyclic time-dependent dependency graph for quick deadlock prevention. In the dependency graph, the vertex variables and the link variables that define the dependency graph are all CAS (compare and swap) variables pertaining to locks in the lock management system, for which only atomic operations are performed for the RDMA model. Note that the vertex variables and the link variables of the dependency graph are all stored in the dedicated memory portion in the shared storage node, which are accessible using RDMA by each process at each compute node in the Real Application Clusters (RAC). The time-dependent dependency graph is an acyclic directed graph, which indicates the dependency relationship among locks in the given system.

Figure 4:
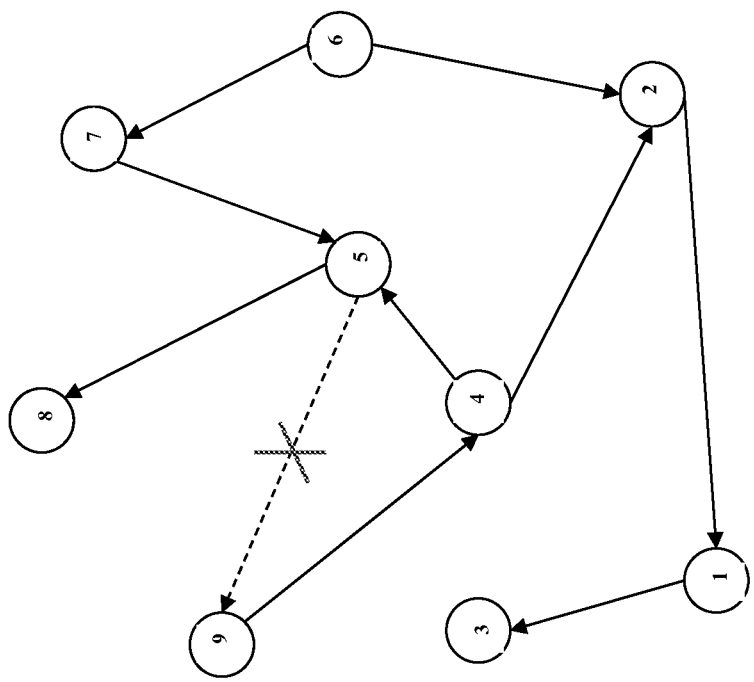
FIG. 4 illustrates an acyclic time-dependent dependency graph for deadlock prevention/detection according to embodiments of the invention.

FIG. 4 shows an example of an acyclic time-dependent dependency graph 400 that is used for deadlock detection in the proposed semi-distributed lock management (SDLM) approach. Each vertex is represented as a compare-and-swap (CAS) variable to indicate a designated lock to protect a given shared resource. Each edge is also represented as a compare-and-swap (CAS) variable to indicate the time-dependent nature of the lock relations in the dependency graph for lock detection. In the example depicted in FIG. 4, there are a total of nine vertices, each of which represents a lock that safeguards a shared resource. For example, an edge from vertex 9 to vertex 4 indicates that a process that is holding an exclusive locking right on shared resource 9 had a subsequent failed lock request for shared resource 4. Similarly, an edge from vertex 4 to vertex 5 indicates that a process that is holding an exclusive locking right on shared resource 4 had a subsequent failed lock request for shared resource 5.

Now, consider a process that holds an exclusive locking right on the shared resource 5 and that it has a subsequent failed lock request for shared resource 9. In this case, if the graph is modified to include an edge from 5 to 9, then a loop will be formed as follows: 9→4→5→9. This loop indicates the presence of a deadlock.

To perform deadlock prevention, this loop is not permitted to be formed, e.g., the process that hold the locking right on shared resource 5 cannot be permitted to be placed into a wait state for resource 9 under these conditions. By preventing this loop, the subsequent deadlock has also been prevented. In practice, since graph 400 is a time-dependent acyclic graph, what this means is that by definition, such loops are not permitted in these types of graphs, e.g., where the time-dependency aspect of the graph is used to identify the latest in time action that would potentially create a loop (e.g., possible addition of edge from 5 to 9), and prevent modification of the graph by that action (e.g., prevent inclusion of edge from 5 to 9 if this modification of the graph 400 would create a loop).

Therefore, with this acyclic time-dependent dependency graph that is defined by a set of CAS variables and are directly accessible by each process at each compute node in the cluster, one can always guarantee that the database system is deadlock-free. This greatly simplifies the complicated deadlock detection process, which is often a daunting task for existing distributed lock management solutions.

Deadlock detection and correction can also be performed in some embodiments, e.g., if the graph 400 is not an acyclic graph. In this situation, loops would be permitted in the graph, e.g., a loop will be formed as follows: 9→4→5→9. Such loops are an indication of a deadlock. Therefore, deadlock detection in this circumstance would be performed by checking for the presence of loops in the graph.

Figure 5:
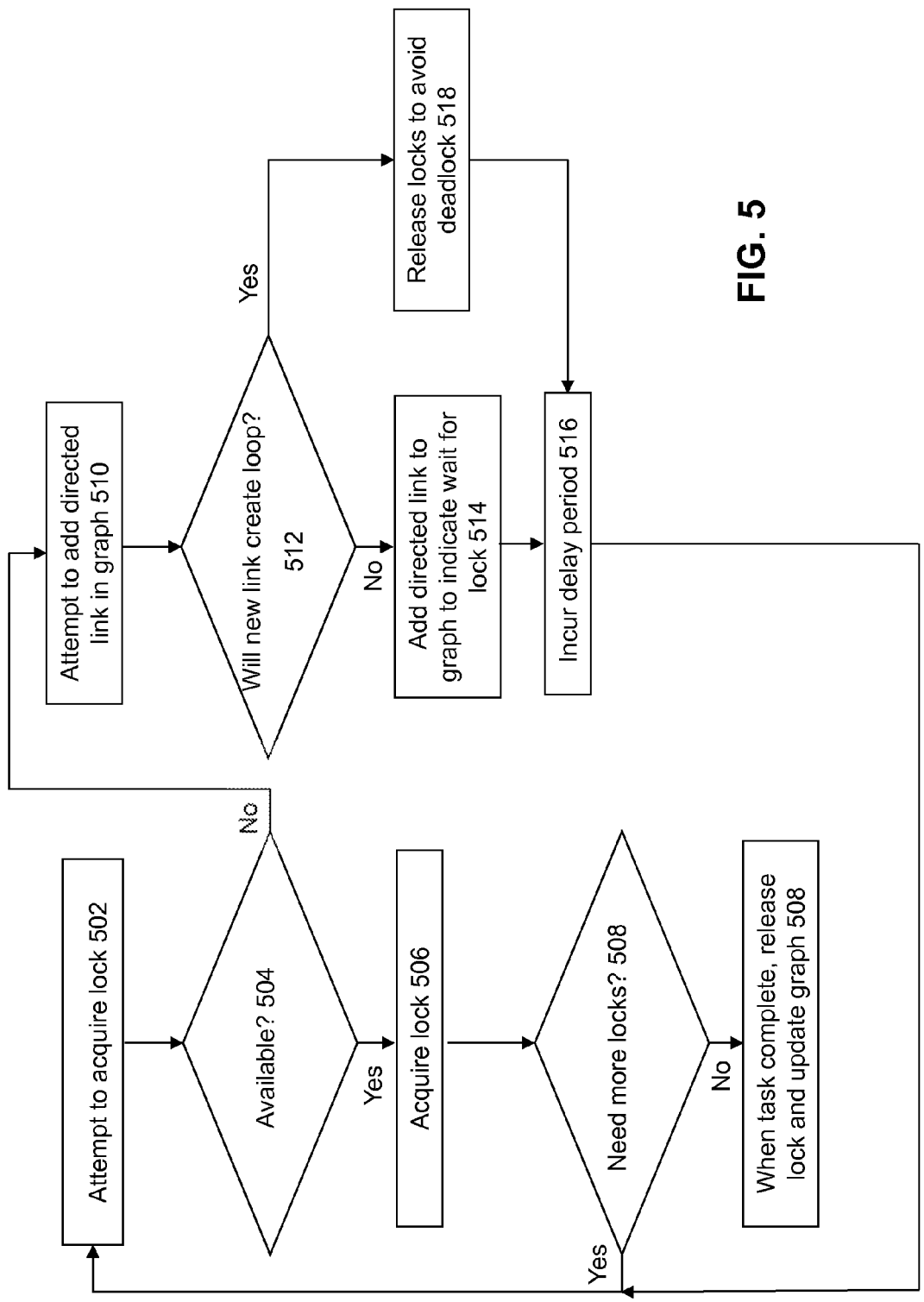
FIG. 5 illustrates a flowchart of an approach to implement an acyclic time-dependent dependency graph for deadlock prevention/detection according to embodiments of the invention.

FIG. 5 illustrates a flowchart of a process for preventing deadlocks using an acyclic time-dependent dependency graph according to some embodiments of the invention. At 502, an attempt is made to acquire a lock on a resource. As described above, RDMA is employed to access a CAS lock structure to obtain a lock on the resource. A determination is made at 504 whether the process will be blocked from acquiring the desired lock, e.g., based at least in part upon whether or not there is already a blocking lock on the resource. For example, an exclusive lock that already exists for the resource is always a blocking lock. Other types of locks can be blocking locks too, depending on the combinations of the lock modes. For instance, an existing shared lock may be a blocking lock if the current request is for an exclusive lock.

To determine whether there is a blocking lock, one can check (a) if the holding lock is an exclusive lock; if the answer is yes, then it is holding a blocking lock; (b) in the acyclic time-dependent graph, if there are direct incoming edges toward the lock vertex that is corresponding to the holding lock; if the answer is yes, then the holding lock is a blocking lock, which in this sense, the blocking property of a lock is of a dynamic nature.

The shared storage node includes an acyclic time-dependent dependency graph that is updated during the process of acquiring, or attempting to acquire, the lock. The dependency graph is a graph defined by CAS (compare and swap) vertex variables and CAS edge/link variables that are stored in a dedicated memory portion in the shared storage node in the real application clusters (RAC). The CAS variables that are associated with the graph are accessible using RDMA by each process at each compute node in the cluster. The graph indicates the dependency relationship among locks in the given system. If one is holding a blocking lock, say Lock A, and it has a subsequent failed trial of getting hold of another lock, say Lock B, an edge from the vertex of Lock A to the vertex of Lock B must be added in the deadlock-prevention graph. Therefore, the type of modification that needs to be made to the graph is determined by whether or not the lock is available to be acquired by the process. In some embodiments, an exclusive lock is always a blocking lock and other types of locks can be blocking locks too, depending on the combinations of the lock modes. To see if one is holding a blocking lock, one checks: (a) if the holding lock is an exclusive lock, if the answer is yes, then it is holding a blocking lock; (b) in the deadlock-prevention graph, if there are direct incoming edges toward the lock vertex that is corresponding to the holding lock. If the answer is yes, then the holding lock is a blocking lock. In this sense, the blocking property of a lock is of a dynamic nature.

If the lock cannot be acquired, then an attempt is made at 510 to make the appropriate modifications to the graph to indicate that the process will wait for the lock. The reason for updating the graph in this situation is to provide the deadlock prevention/detection. For example, when a process holds a lock in exclusive mode and it has a subsequent failed request for another lock to access another shared resource, it must update the acyclic time-dependent dependency graph. As mentioned before, the dependency graph is a graph defined by CAS (compare and swap) vertex variables and CAS edge/link variables that are stored in a dedicated memory portion in the shared storage node in the real application clusters (RAC), where the graph indicates the dependency relationship among locks in the given system. If a process already holds an exclusive lock A and it has a subsequent failed trial of getting hold of lock B, then a directed link is added from A to B.

A determination is made at 512 whether modification of the graph to include the new directed link will create a loop. Whenever there is a loop detected in the time-dependent dependency graph, then one can say that an impending deadlock is detected. This is because if one process is blocking another one while holding a lock, it will be shown in the graph as a loop. Regardless of how many locks/processes are involved, if any new edge is attempted to be added to the graph that forms a loop, then this new edge cannot be added in the graph since it indicates the presence of a deadlock (and addition of a loop would violate the foundational basis for an "acyclic" graph).

Some action can therefore be taken upon detection of the loop to prevent the deadlock. For example, at 518, the process that most recently requested the lock on the blocked resource can be instructed to release all of its locks, i.e., for the current process whose request for the resource would otherwise cause a loop. This breaks the potential deadlock based upon timing of the corresponding processes/locks.

If, however, the new link will not create a loop, then at 514 the directed link is added to the graph as appropriate to reflect the current request for a lock on the resource. A delay period is then incurred for the current request for a lock before a new request can be made. The delay period may be established, for example, as a random delay period using an exponential backoff function or other suitable backoff functions, depending on system resource availability and system dynamics, where the random number is generated with a seed as the function of the CPU ID and the process ID that the given lock request is associated with to minimize the chance of simultaneous trials of the access of the same lock variable using RDMA.

After the delay period, a return is made to 502 to make another attempt to acquire the desired lock on the resource. Another determination is made at 504 whether or not the desired lock is available. The above process is iterated as many times as needed until the desired lock can be acquired, e.g., until there are no blocking locks that would prevent acquisition of the desired lock on the resource.

At that point, the lock is acquired at 506, with any suitable modifications as required to be made to reflect this situation in the graph. The process can then perform any necessary work/tasks on the resource for which the lock is required. Additional locks may be needed, as reflected in the determination of 508 which may cause additional iterations through the above process.

When a process has finished the task requiring the lock(s), then at 508, it will release the lock(s) that it holds. The lock variable values are also accordingly modified using RDMA. If appropriate, e.g., the lock was in exclusive mode, then the acyclic time-dependent dependency graph is also modified to reflect release of the lock. For example, if there are outgoing edges from the lock vertex in the dependency graph as a result of the process' original exclusive holding of the given lock, it will clear all the related outgoing edges from that given lock vertex in the dependency graph.

Therefore, what has been described is an improved technique for performing lock management. A semi-distributed Lock Management (SDLM) system has been described utilizing RDMA and an acyclic time-dependent dependency graph that can lead to higher system performance while maintaining higher flexibility and autonomy for each process at each compute node in the given cluster, in particular for distributed database applications. Overall, the accomplishment of the presented deadlock prevention method utilizes the collective efforts from the processes at the distributed compute nodes in the cluster. On the other hand, the deadlock detection/prevention also utilizes and relies upon centralized control, at a central location to hold lock structures and the acyclic time-dependent dependency graph.

System Architecture Overview

Figure 6:
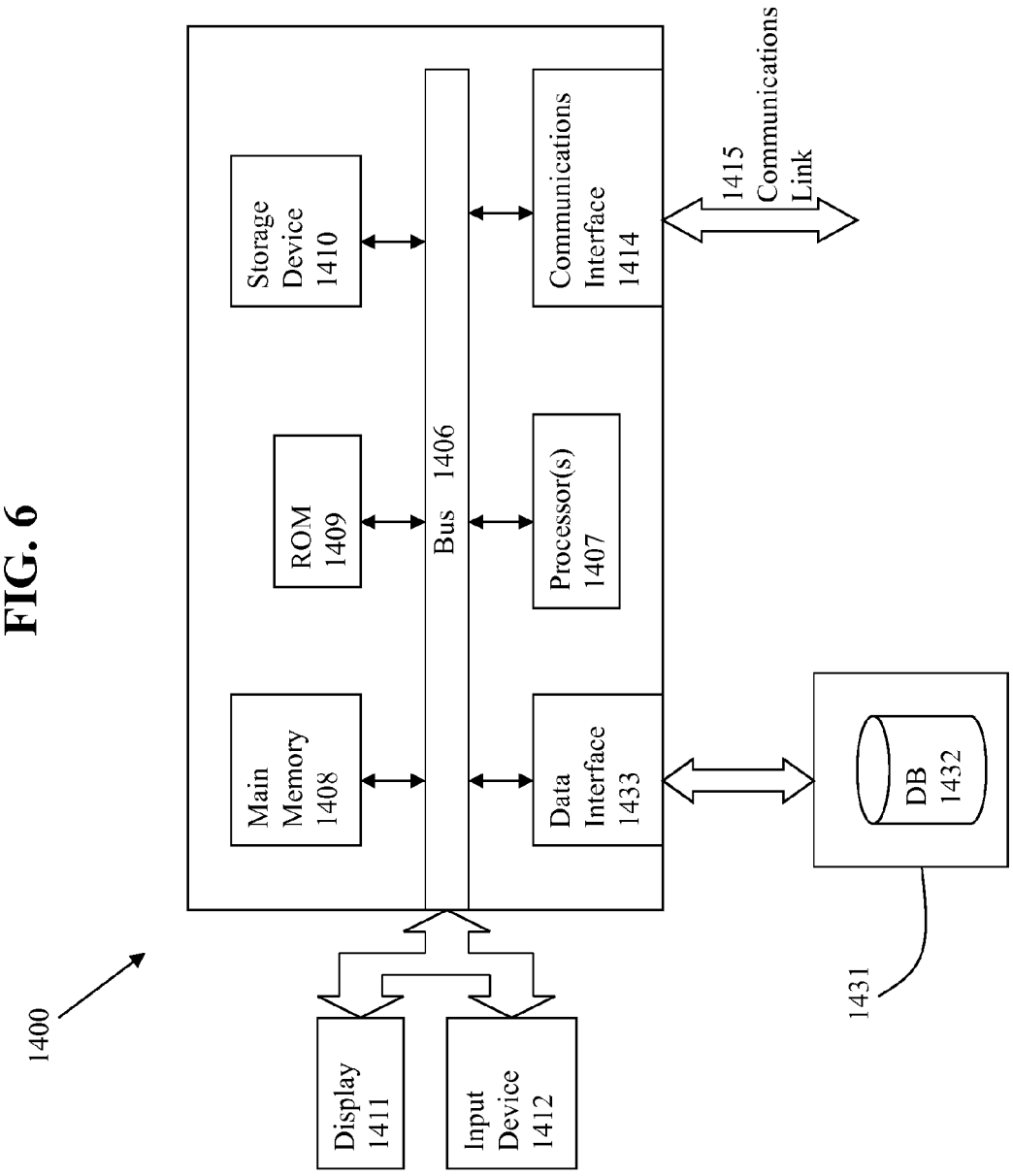
FIG. 6 depicts a computerized system on which an embodiment of the invention can be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing semi-distributed lock management, comprising:
providing a shared locking structure for a resource in a multi-instance system having a plurality of compute nodes and a shared storage node, wherein the shared locking structure is located at the shared storage node;
directly accessing the shared locking structure by a compute node when a process on the compute node seeks to acquire a lock on a resource, wherein the compute node directly accesses the shared locking structure using remote direct memory access (RDMA); and
updating an time-dependent dependency graph while seeking the lock on the resource, wherein the time-dependent dependency graph is used to indicate a lock dependency relationship for deadlock identification.

2. The method of claim 1, wherein the shared locking structure comprises a lock variable defined as a CAS (compared and swap) variable.

3. The method of claim 1, in which the shared locking structure comprises a lock variable that is stored in a dedicated memory portion in the shared storage node.

4. The method of claim 1, wherein an InfiniBand-compliant network protocol is used to communicate between the compute node and the shared storage node.

5. The method of claim 1, vertices and edges of the time-dependent dependency graph are defined as CAS variables.

6. The method of claim 1, in which the time-dependent dependency graph is updated when the process has a failed trial of obtaining another lock to include a directed link corresponding to the another lock.

7. The method of claim 1, in which a random delay period is imposed if the lock cannot be acquired.

8. The method of claim 1, in which the time-dependent dependency graph is updated when the lock is released.

9. The method of claim 1, wherein the time-dependent dependency graph is an acyclic time-dependent dependency graph, and deadlock prevention is performed by prevention of a loop in the acyclic time-dependent dependency graph.

10. The method of claim 9, in which the prevention of the loop in the acyclic time-dependent dependency graph is performed by requiring an entity to release a lock corresponding to the loop.

11. The method of claim 10, in which the prevention of the loop is time-based, wherein an entity that most recently sought the lock for the loop is required to release its locks.

12. The method of claim 1, wherein the time-dependent dependency graph is not an acyclic time-dependent dependency graph, and deadlock detection is performed by identification of a loop in the time-dependent dependency graph.

13. A computer program product embodied on a non-transitory computer readable medium, the computer readable medium having stored thereon a sequence of instructions which, when executed by a processor causes the processor to execute a method, the method comprising:
providing a shared locking structure for a resource in a multi-instance system having a plurality of compute nodes and a shared storage node, wherein the shared locking structure is located at the shared storage node;
directly accessing the shared locking structure by a compute node seeks when a process on the compute node seeks to acquire a lock on a resource, wherein the compute node directly accesses the shared locking structure using remote direct memory access (RDMA); and
updating an time-dependent dependency graph while seeking the lock on the resource, wherein the time-dependent dependency graph is used to indicate a lock dependency relationship for deadlock identification.

14. The computer program product of claim 13, wherein the shared locking structure comprises a lock variable defined as a CAS (compared and swap) variable.

15. The computer program product of claim 13, in which the shared locking structure comprises a lock variable that is stored in a dedicated memory portion in the shared storage node.

16. The computer program product of claim 13, wherein an InfiniBand-compliant network protocol is used to communicate between the compute node and the shared storage node.

17. The computer program product of claim 13, vertices and edges of the time-dependent dependency graph are defined as CAS variables.

18. The computer program product of claim 13, in which the time-dependent dependency graph is updated when the process has a failed trial of obtaining another lock to include a directed link corresponding to the another lock.

19. The computer program product of claim 13, in which a random delay period is imposed if the lock cannot be acquired.

20. The computer program product of claim 13, in which the time-dependent dependency graph is updated when the lock is released.

21. The computer program product of claim 13, wherein the time-dependent dependency graph is an acyclic time-dependent dependency graph, and deadlock prevention is performed by prevention of a loop in the acyclic time-dependent dependency graph.

22. The computer program product of claim 21, in which the prevention of the loop in the acyclic time-dependent dependency graph is performed by requiring an entity to release a lock corresponding to the loop.

23. The computer program product of claim 22, in which the prevention of the loop is time-based, wherein an entity that most recently sought the lock for the loop is required to release its locks.

24. The computer program product of claim 13, wherein the time-dependent dependency graph is not an acyclic time-dependent dependency graph, and deadlock detection is performed by identification of a loop in the time-dependent dependency graph.

25. A semi-distributed lock management system, comprising:
a plurality of compute nodes; and
a shared storage node, wherein the shared storage node comprises a shared locking structure and an time-dependent dependency graph,
wherein the shared locking structure is directly accessible by a compute node when a process on the compute node seeks to acquire a lock on a resource and the time-dependent dependency graph is indicative of a lock dependency relationship for deadlock identification; and
wherein the compute node directly accesses the shared locking structure using remote direct memory access (RDMA).

26. The system of claim 25, wherein the shared locking structure comprises a lock variable defined as a CAS (compared and swap) variable.

27. The system of claim 25, in which the shared locking structure comprises a lock variable that is stored in a dedicated memory portion in the shared storage node.

28. The system of claim 25, wherein an InfiniBand-compliant network protocol is used to communicate between the compute node and the shared storage node.

29. The system of claim 25, vertices and edges of the time-dependent dependency graph are defined as CAS variables.

30. The system of claim 25, in which the time-dependent dependency graph is updated when the process has a failed trial of obtaining another lock to include a directed link corresponding to the another lock.

31. The system of claim 25, in which a random delay period is imposed if the lock cannot be acquired.

32. The system of claim 25, in which the time-dependent dependency graph is updated when the lock is released.

33. The system of claim 25, wherein the time-dependent dependency graph is an acyclic time-dependent dependency graph, and deadlock prevention is performed by prevention of a loop in the acyclic time-dependent dependency graph.

34. The system of claim 33, in which the prevention of the loop in the acyclic time-dependent dependency graph is performed by requiring an entity to release a lock corresponding to the loop.

35. The system of claim 34, in which the prevention of the loop is time-based,
wherein an entity that most recently sought the lock for the loop is required to release its locks.

36. The system of claim 25, wherein the time-dependent dependency graph is not an acyclic time-dependent dependency graph, and deadlock detection is performed by identification of a loop in the time-dependent dependency graph.

* * * * *

UNITED STATES PATENT AND TRADEMARK OFFICE
CERTIFICATE OF CORRECTION

PATENT NO.       : 8,868,604 B2
APPLICATION NO.  : 13/627808
DATED            : October 21, 2014
INVENTOR(S)      : Li It is certified that error appears in the above-identified patent and that said Letters Patent is hereby corrected as shown below:

In The Specification

In column 5, line 52, delete "InfiniBand" and insert -- InfiniBand. --, therefor.

Signed and Sealed this
Twenty-third Day of June, 2015

Michelle K. Lee
*Director of the United States Patent and Trademark Office*